W. BURROWS.

Stove.

No. 6,663. Reissued Sept. 28, 1875.

Witnesses:
Charles Thurman
R. T. Dyer.

William Burrows
Inventor
by
Thos. S. Sprague
Atty

N. PETERS, PHOTO-LITHOGRAPHER, WASHINGTON, D. C.

BEST AVAILABLE COPY

UNITED STATES PATENT OFFICE.

WILLIAM BURROWS, OF NEW YORK, N. Y., ASSIGNOR TO JORDAN L. MOTT.

IMPROVEMENT IN STOVES.

Specification forming part of Letters Patent No. 165,208, dated July 6, 1875; reissue No. 6,663, dated September 28, 1875; application filed September 4, 1875.

*To all whom it may concern:*

Be it known that I, WILLIAM BURROWS, of the city, county, and State of New York, have invented new and useful Improvements in Stoves, of which the following is a specification:

The nature of my invention relates to improvements in the ornamentation of stoves; and it consists in the employment of tiles, ornamented or plain, removably secured to the iron plates of which the stoves are constructed.

Figure 1:
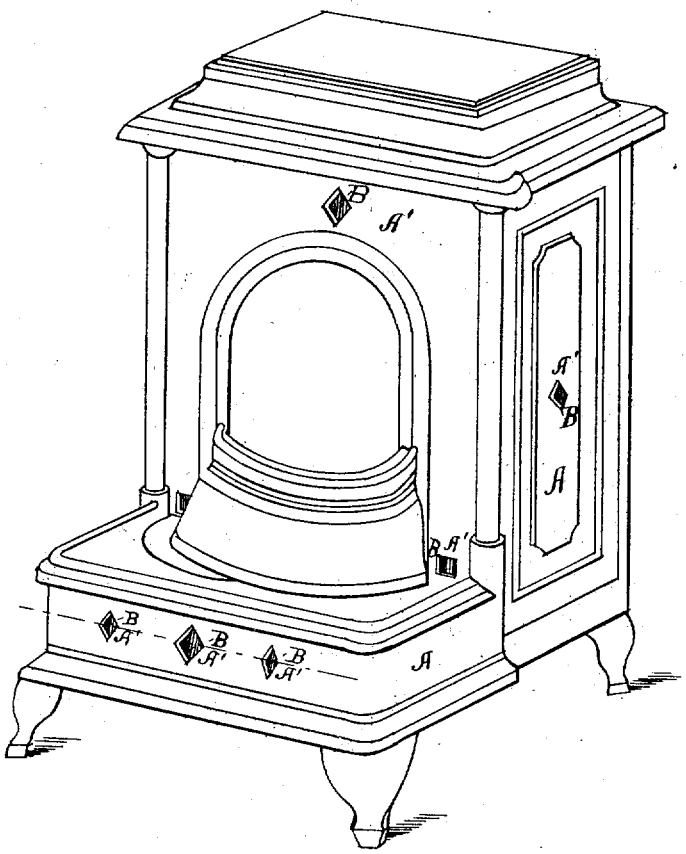
Figure 2:
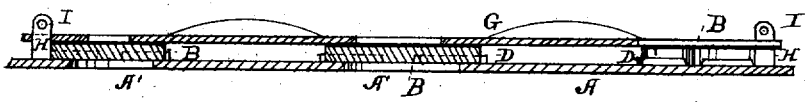

Figure 1 represents a perspective view of a stove, showing my invention. Fig. 2 is a section of one of the plates, showing one of the methods of attaching the tiles so that, at will, they may be removed.

The tiles should be so secured that any of them may be readily removed, and others replaced, should any of them become broken or tarnished, or if it should be desired to change the style of the ornamentation; and all this should be done without the necessity of employing skilled labor to make such changes.

In the drawings, A represents the plates of a cast-metal stove, to which my invention is applicable, having cast therein openings, A′, leaving a smooth surface on the outside and flanges, D, on the inside corresponding in form to the openings A′, with the exception of being a little larger, in order to leave a bearing on the back of the plate inside of the flanges. The plates are also provided with lugs, H, cast thereon, having perforations, I, at the top. These lugs are in proper position to allow a slotted bar, G, to be placed thereon and secured in place by pins passing through perforations I, the bar passing over the openings A′, one or more of them, as may be desired. B represents the tiles used for ornamentation, made of the form of the openings, (which may be of any desired form,) but of sufficient size to cover the entire opening and fit inside the flanges D. This tile may be of any desired material used for ornamentation and like purposes, and in any form desired. The tiles are placed within the flanges D, and the bar G placed on the lugs H and pins passed through the perforations I, and the tiles are thus pressed firmly in place, and held from sliding or slipping by the flanges D.

In cleaning or polishing the stoves ornamented in this manner, it is necessary to prevent soiling the faces of the ornamental tiles, that they should be removed. In order to do this the fastenings should be of such a simple character that any one may easily and readily remove and replace them. Consequently I do not desire to confine myself to the method of fastening herein described.

I am aware that various kinds of ornamentation have been used in connection with stoves, some by having the ornamented surface secured rigidly in place, and by screw-flanges, and I do not claim any such devices; but—

What I desire to secure by Letters Patent, as my invention, is—

1. As an improvement upon ornamental stoves, a stove made of cast-metal plates, and ornamented with tiles removably secured to openings in the various plates for the purpose of displaying the faces of the tiles to view through or within said openings, substantially as described.

2. In ornamental stoves, the combination of cast-metal plates, having openings for the display of ornamental tiles, with plates having flanges or lugs upon the same adapted to hold said tiles and display them through or within said openings, as well as to permit the removal or replacement of the same without disturbance of the proper plates, substantially as described.

WILLIAM BURROWS.

Witnesses:
MAX GOEBEL,
HENRY MOSFORD.

BEST AVAILABLE COPY